United States Patent [19]
Knowles

[11] Patent Number: 6,008,946
[45] Date of Patent: Dec. 28, 1999

[54] AMBIENT LIGHT DISPLAY ILLUMINATION FOR A HEAD-MOUNTED DISPLAY

[75] Inventor: Gary R. Knowles, Arden Hills, Minn.

[73] Assignee: Honeywell, Inc., Minneapolis, Minn.

[21] Appl. No.: 08/966,142

[22] Filed: Nov. 7, 1997

[51] Int. Cl.[6] .......................... G02B 27/14; G02B 27/10; G02B 5/12; G02B 27/00

[52] U.S. Cl. .......................... 359/630; 359/618; 359/518; 359/577

[58] Field of Search ................................. 359/618, 518, 359/577, 630

[56] References Cited

U.S. PATENT DOCUMENTS

| | | | |
|---|---|---|---|
| 3,574,283 | 4/1971 | Albers | 73/178 |
| 4,997,263 | 3/1991 | Cohen et al. | 350/345 |
| 5,136,479 | 8/1992 | Ruffner | 362/29 |
| 5,162,828 | 11/1992 | Furness | 353/122 |
| 5,420,828 | 5/1995 | Geiger | 367/131 |
| 5,479,276 | 12/1995 | Herbermann | 359/48 |
| 5,537,253 | 7/1996 | Cox | 359/630 |
| 5,550,715 | 8/1996 | Hawkins | 362/31 |
| 5,576,887 | 11/1996 | Ferrin et al. | 359/631 |
| 5,608,837 | 3/1997 | Tai et al. | 385/146 |

FOREIGN PATENT DOCUMENTS

| | | | |
|---|---|---|---|
| 0547493 | 6/1993 | European Pat. Off. | G02B 26/08 |
| 0716329 | 6/1996 | European Pat. Off. | G02B 27/02 |
| 9318428 | 9/1993 | WIPO | G02B 27/00 |

*Primary Examiner*—Georgia Epps
*Assistant Examiner*—Michael A Lucas
*Attorney, Agent, or Firm*—Albert K. Kau

[57] ABSTRACT

A head mounted display in which ambient light is used to illuminate a display to at or near the brightness of the scene being viewed when both reach the user's eyes. A small supplemental light source may further be used to increase the range of operation of the display when ambient light levels are insufficient to make the display screen viewable.

5 Claims, 3 Drawing Sheets

AMBIENT LIGHT DISPLAY ILLUMINATION FOR A HEAD-MOUNTED DISPLAY

BACKGROUND OF THE INVENTION

This invention relates generally to normalization of head-mounted display brightness to ambient light level brightness. More specifically, the invention describes a method and apparatus for using ambient light to backlight a display panel in a head-mounted display unit.

Head-mounted displays utilize projection techniques or other methods to place information or symbols in or very near the user's field of vision for fast reference or targeting.

Generally, the head-mounted display system is utilized when the user is attempting to monitor both the information on the display, and simultaneously remain vigilant about his environment.

The ambient light levels of the scene viewed by the user may vary as much as 2000 to 1 in brightness. Consequently, for the user to be able to effectively view the image on the display and the scene at the same time, the brightness level of the scene and the image on the display when they reach the eye must be similar, or the user's eyes will not register both. Thus display brightness must be constantly adjusted to compensate for changes in ambient brightness.

Adjustment for the backlight in the past may have been manual, and thus under the user's control, or may have been done by a microcontroller or similar device in conjunction with a light sensor. The disadvantage of the former is that the user must have used some of his/her concentration to adjust the light level of the display image which may in some cases be extremely inconvenient. An electronically controlled backlight does not disturb the user, but requires some form of control algorithm, which has proven to be a difficult control problem.

Use of a backlight for the display has other difficulties. It adds weight to the display regardless of how it is controlled; heating of the user's head is a problem, as is power usage. In many cases, in fact, it has not been possible to mount a light on the head-mounting to compensate for the large range of ambient light changes, without unacceptable power usage and/or excessive weight and heat dissipation on the helmet.

Movement of components and lighting sources off from the head-mounting and transmitting light to the head-mounting via fiber optic cables is another option, but typically this solution restricts movement of the users head and the cables are subject to breaks and misconnections.

SUMMARY OF THE INVENTION

The present invention solves the above and other problems by using ambient light to backlight a display to the same or near the same brightness as the scene being viewed when both reach the user's eyes. A small, lightweight supplemental light source may also be used to increase the range of operation of the display when the ambient light brightness insufficiently illuminates the display.

DETAILED DESCRIPTION OF THE PREFERRED EMBODIMENT

Figure 1:
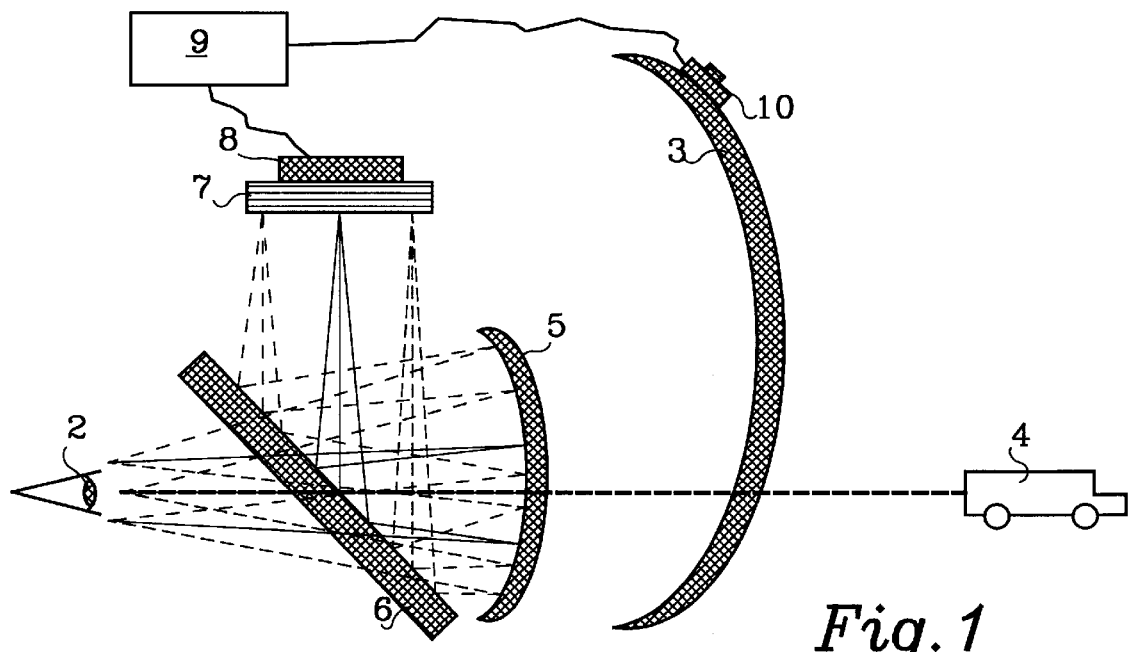
FIG. 1 shows the prior art system for lighting a display in a head-mounted display system.

FIG. 1 shows one type of prior art system of head-mounted display. All components are mounted on a helmet unit or other head-mounting generally indicated by numeral 1. The user of the display is located so that his or her eye is located at a viewing location 2. A tinted visor 3 typically covers the users face, and helps reduce ambient light intensity.

The viewed scene at viewing location 2 is shown to contain an object or objects 4 and light therefrom passes through visor 3, through a curved, partially transparent combiner 5, and through a beamsplitter 6 to the viewing location 2. Object or objects 4 may also be called and will be referred to as the viewed scene.

A display 7 produces an image which reflects off beamsplitter 6 and is refocused by the internal surface of the combiner 5. Rays of light from a particular point on the display diverge as they leave the display, but are collimated by the combiner so that they are parallel, or nearly parallel when they leave the combiner. The image from the combiner is then reflected to pass through the beamsplitter and arrive at the user's eyes, which are positioned at viewing location 2. The accuracy of the collimation required will depend on the ability of the user's eyes to detect discrepancies, and the effect the designer wishes to achieve. Further, optic elements such as lenses, which are not shown, may be used to size, shape or deform the display image to the designer's requirements. Typically the projection optics, the combiner, or both, are used to make the image from the display to appear at infinity, to appear at the same distance as the scene being viewed, or to appear at another distance specified by the designer, for example, optimal reading distance.

Many variations on this basic system are possible. For example, the visor itself may act as the combiner, or, with suitable projection optics, the combiner may be flat.

In any event, in order to adjust the intensity of the display image, a backlight 8 projects light through display 7. In FIG. 1, the backlight is shown as being controlled by an intensity control means 9, which receives an ambient light level signal from an ambient light detector 10. This system, as is known in the art, may be replaced by a manually operated dimmer switch for intensity control.

An embodiment of the applicant's system will now be described with reference to FIG. 2. All components are again contained on a helmet unit or other head-mounting 21, having a viewing location 22 where the user's eye will be located. The visor, labeled 23 in FIG. 2 now comprises a shaded portion 23a, which corresponds to the field of view of the user, and a more clear portion 23b which allows a predetermined amount of light into a selected portion of the helmet unit or other head-mounting, isolated from the eye at viewing location 22. Visor portion 23b may, in fact, simply be an opening in the visor.

Images of the object or objects 24 in the field of view of the user pass through shaded portion 23a of visor 23, a combiner 25 and a beamsplitter 26 to the viewing location 22 as in the prior art. The parallel lines breaking the rays passing through visor 23 indicate that in actuality object or objects 24 are more distant from the visor than the size of the paper allows them to be drawn. Similar break lines appear throughout the remaining figures.

Ambient light from the scene passes through clear portion 23b of visor 23, and strikes an ambient light director 28 which directs the light onto the back of a display 27. Display 27 is typically an LCD display but may be any display type which can be backlit in a similar manner to an LCD display. For example, other types of displays might be AMLCD, PAMEL or micro-mirror displays. Generally, any type of display requiring an external source of light would be suitable.

In any event, the image on display 27 is transmitted to a beamsplitter 26 where it is reflected to a curved combiner 25, so that the image may be viewed from the viewing location 22, through beamsplitter 26.

Of, course, optical elements such as lenses, which are not shown can be used to shape, alter, size or focus the display image relative to the viewed scene.

A more detailed discussion of the means by which the applicant's system normalizes the display intensity to that of the viewed scene will now be described in connection with FIG. 3. For clarity in the figure, only a single ray of light is shown as emerging from each illustrated location on the display. As was shown in the earlier figures, more than one ray would emerge from any given point on the display, the rays occurring over a range of angles. Normalization of display image intensity to ambient light conditions refers to adjusting the display brightness as seen by the eye to be nearly the same as the ambient brightness as seen by the eye. The ideal brightness of the display is actually slightly brighter than the ambient light of the viewed scene. Specifically, the ratio of the display brightness to the ambient or background light levels is characterized by the equation:

$$\frac{B_{LCD} + B_{ambient}}{B_{ambient}} \geq 1.2, \qquad (\text{Equ. 1})$$

where: $B_{LCD}$=display brightness, and
$B_{ambient}$=ambient brightness.
Preferably, the display brightness is not significantly brighter than the ambient brightness or it may overpower the viewed scene altogether.

Figure 2:
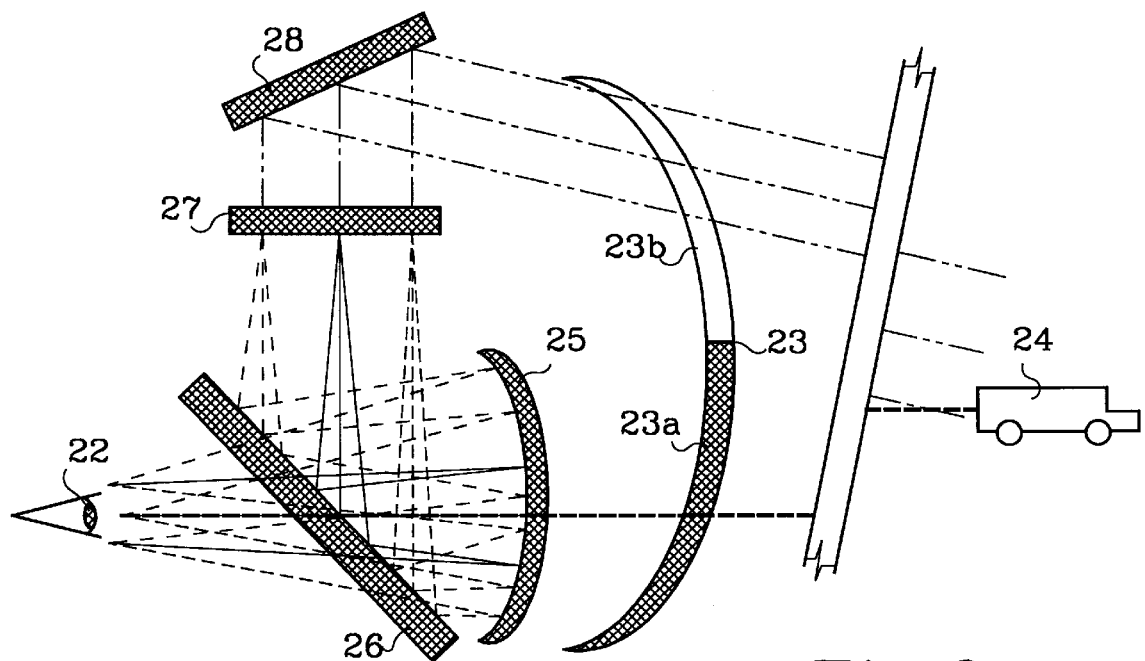
FIG. 2 shows the applicant's proposed ambient backlighting system.
Figure 3:
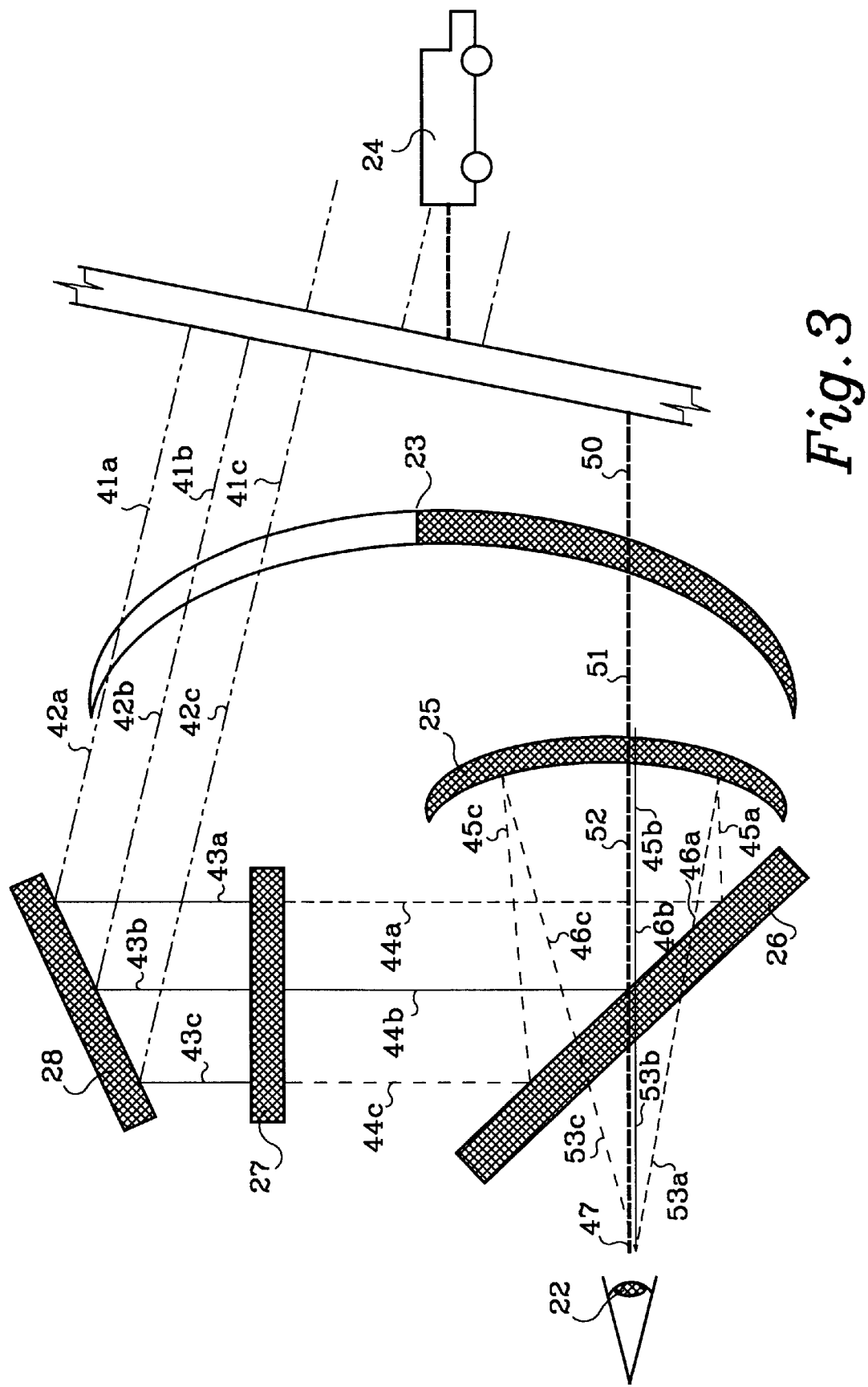
FIG. 3. shows a larger view of the applicant's ambient backlighting system including labeling for select light rays within the system.

FIG. 3 shows the various rays traveling into and through the components of the head-mounted display system of FIG. 2. A loss of intensity is associated with each component as light passes through it. Thus, for example the three rays of light, 41a, 41b and 41c, from a scene containing the object 24, will be attenuated a certain amount when they pass through visor 23. These attenuated light rays emerging from visor 23 are labeled as 42a, 42b and 42c. Table 1 indicates losses for various of the components of the system, and will be used for the calculations to follow.

TABLE 1

| Component | Component transmittance or reflectance as a percentage Amount (as %) |
|---|---|
| Visor transmittance - clear portion 23b | 100 |
| Ambient light director 28 | 90 |
| LCD 27 transmittance | 22 |
| Beamsplitter 26 reflectance | 50 |
| Combiner 25 reflectance | 70 |
| Beamsplitter transmittance | 50 |

TABLE 1-continued

| Component | Component transmittance or reflectance as a percentage Amount (as %) |
|---|---|
| Visor transmittance - shaded portion 23a | 35 |
| Combiner 25 transmittance | 30 |
| Beamsplitter 26 transmittance | 50 |

Referring again to FIG. 3, the scene surrounding object 24 has an ambient brightness of $B_{amb}$. The ambient light labeled as rays 41a–41c passes through less obscured portion 23a of visor 23 and emerges along paths 42a–42c. The intensity of the light in paths 42a–42c would thus be the visor transmittance times the ambient light level, or:

$$B_{amb} * 100\% = B_{amb}. \qquad (\text{Equ. 2})$$

Light 42a–42c from the visor thereafter strikes ambient light director 28 producing light rays 43a–43c which are attenuated to 90% of light rays 42a–42c or:

$$B_{amb} * 90\% = 0.9 \ (B_{amb}). \qquad (\text{Equ. 3})$$

Lights rays 43a–43c pass through display 27 and are attenuated to 22% of their value, creating light rays 44a–44c which have a luminance of:

$$0.9 \ (B_{amb}) * 22\% = 0.20 \ (B_{amb}). \qquad (\text{Equ. 4})$$

In a similar manner, the ambient light is attenuated by reflection from beamsplitter 26, reflection from parabolic combiner 25, and transmittance through beamsplitter 26, producing a final display brightness ($B_{LCD}$) of:

$$B_{LCD} = (0.5) \ (0.7) \ (0.5) \ [0.20 \ (B_{amb})] \qquad (\text{Equ. 5})$$

$$= 0.035 \ B_{amb}. \qquad (\text{Equ. 6})$$

A scene brightness $B_{scene}$ may also be calculated as:

$$B_{scene} = (0.35) \ (0.30) \ (0.50) B_{amb} \qquad (\text{Equ. 7})$$

$$= .053 \ B_{amb}. \qquad (\text{Equ. 8})$$

where 0.35 is the loss through the visor portion 23a, 0.3 is the loss through combiner 25, and 0.5 is the loss at beamsplitter 26.

From Equation 1, the ratio of scene to display brightness would be:

$$\frac{0.053 \ B_{amb} + 0.035 \ B_{amb}}{0.053 \ B_{amb}.} = 1.66 \qquad (\text{Equ. 9})$$

which is within the limits set by Equation 1.

As a comparison, a typical backlight in the prior art might produce about four percent of typical daylight brightness. Thus, using Equation 4:

$$B_{LCD} = (1) \ (.9) \ (.22) \ (.5) \ (.7) \ (.5) \ [(0.04) \ B_{amb}] \qquad (\text{Equ. 10})$$

$$= .0014\, B_{amb}. \quad\text{(Equ. 11)}$$

which corresponds to a ratio of scene to display brightness of:

$$\frac{.053\, B_{amb} + .0014\, B_{amb}}{.053\, B_{amb}} = 1.03 \quad\text{(Equ. 12)}$$

which is below the minimum acceptable level of 1.2.

More importantly, equation 9 shows that the ambient light is removed as a variable from the equation, and that losses in the components of the system determine the relative brightness between the display and the scene when the applicant's invention has been implemented, independent of scene brightness. (In Equ. 12, $B_{amb}$ will also cancel out of the equation, but only because the artificial backlight brightness has arbitrarily been given in terms of scene brightness). The values for light losses shown in Table 1 are for example only, and will vary from system to system. For example, if the visor is used as the combiner, losses from the beamsplitter would be eliminated from the equations. It is also expected that visor transmittance will vary widely from application to application and environment to environment.

Figure 4:
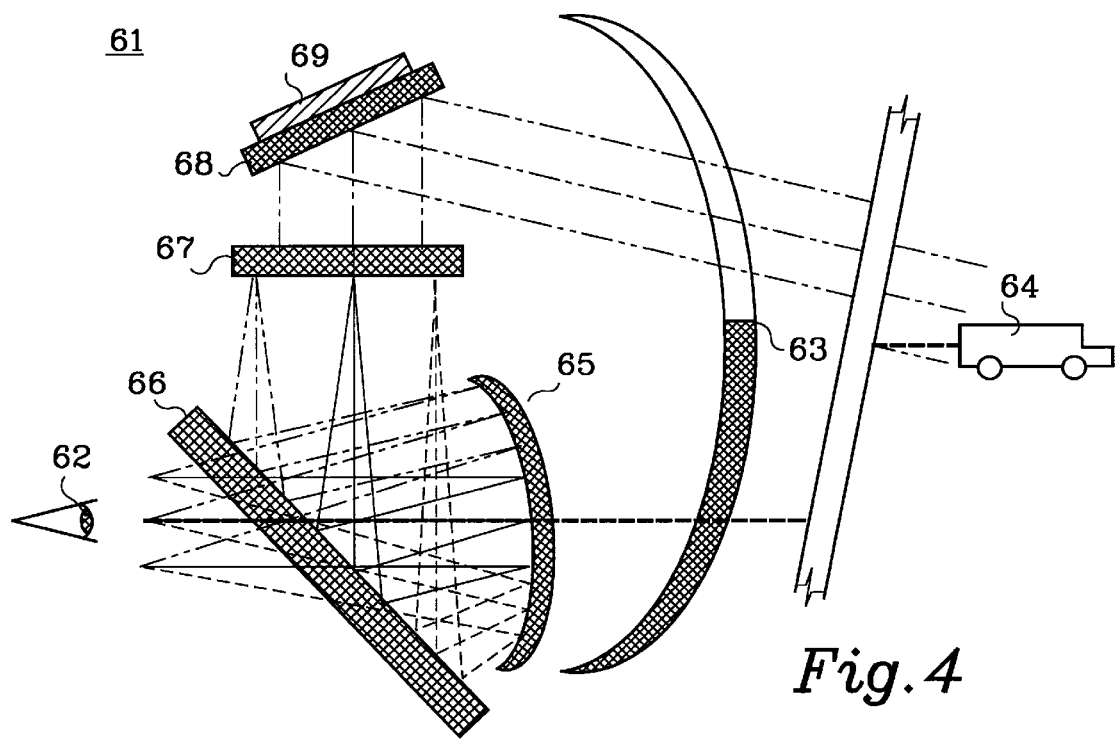
FIG. 4 shows the applicant's system including a supplemental light source.

When ambient brightness drops below a predetermined level, it may no longer serve sufficiently as a backlighting source to make the image on the display visible to the user. In these cases, a supplemental light source may be added to augment the ambient light. This embodiment of the Applicant's system is shown in FIG. 4. The supplemental light source will be significantly smaller and lighter than the typical backlight used in such systems, since it is only used when ambient brightness does not produce sufficient visibility of the display image. The supplemental light source may be controlled as in prior art systems, such as by using an ambient light detector and control electronics, causing it to activate or be variably controlled. It may also however, be left on over all ambient light ranges to eliminate control electronics. At higher light levels, the supplemental light source will be nearly negligible compared to the ambient backlighting used to brighten the display screen. Thus there is really no reason to turn the supplemental light source on and off. This obviously simplifies the system as it eliminates any control electronics.

In FIG. 4, the supplemental light source 69 is shown added on the back of light director 68 which is now made partially transmissive. Remaining components 62–67 operate similar to parts 22–27 of FIG. 2, respectively. Since the supplemental light source need only operate when ambient light levels are low, it can be substantially less powerful than typical backlights. This will reduce its overall weight and heat output of the system.

The applicant's invention has been contemplated as part of a helmet mounting for a pilot. It would also be possible to use the applicant's invention as a stand-alone unit, or as part of another type of head-mounted apparatus. For example, the invention would be useful in a manufacturing setting, in which a head-band apparatus utilizing the applicant's invention provides information about the manufacturing process or particular manufactured items in front of the user. Certainly, even further applications are possible. For example, the Applicant's invention could be developed to work similar to current portable tape and CD players, providing access to Internet, e-mail or other visual forms of data for entertainment or business purposes.

Figure 5:
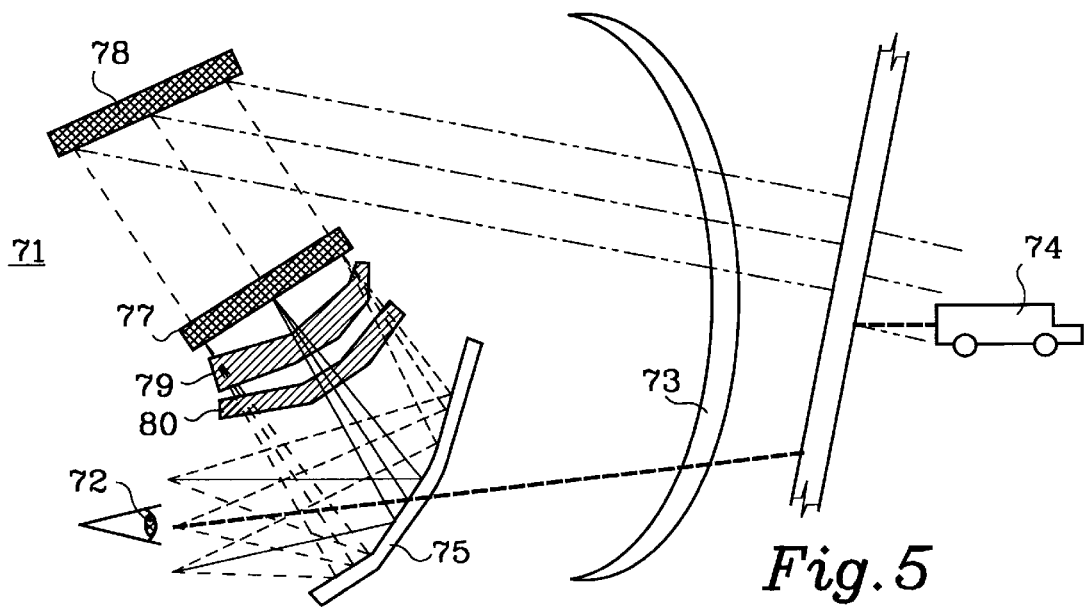
FIG. 5 shows the applicant's invention using an alternate optics configuration.

While the applicant as specifically described an arrangement of mirrors and other components for use of ambient light to backlight a display, other arrangements are also possible. For example, in FIG. 5 an ambient light director 78 is shown which directs ambient light through a display 77, lenses 79 and 80, to a combiner 75 which are described more fully in U.S. Pat. No. 5,576,887 to Ferrin et al. and assigned to Honeywell, Inc. Remaining parts 72–74 operate similar to parts 22–24 of FIG. 2, respectively. It is also noted that visor 73 may be optional, depending on the designer's application. As another example, a transparent display may be placed between the viewing location and the scene, either as the visor or with a visor covering the display, and lenses on the display used to superimpose the display image on the scene passing through the display.

As the above examples show, many variations are possible and the above-described embodiments should not be taken as the limits of the applicant's contemplated system, rather the following claims should be used to define the scope of the applicant's invention.

I claim:

1. A method of positioning an image from a display on a viewed scene comprising the steps of:

directing ambient light through the display;

passing the image from the display to a combiner;

passing the viewed scene through the combiner whereby the image from the display is superimposed on the viewed scene;

directing light from a supplemental light source through the display activating the supplemental light source when the ambient light drops below a predetermined level; and directing light from the supplemental light source though the display to augment the ambient light passing through the display.

2. Apparatus for positioning an image from a display on a viewed scene comprising:

an ambient light director for directing ambient light from the viewed scene through the display;

a combiner for receiving the image from the display and causing it to be superimposed on the viewed scene;

a supplemental light source which augments the light supplied by the ambient light director to the display; and an ambient light detector for detecting the level of ambient light, and causing the supplemental light source to augment the light supplied to the display when the level of ambient light drops below a predetermined level.

3. Apparatus according to claim 2 wherein the supplemental light source remains on throughout all levels of ambient light.

4. Apparatus according to claim 2 wherein the display is of the type selected from the group consisting of AMLCD, PAMEL or micro-mirror displays.

5. Apparatus according to claim 2 further comprising:

a beamsplitter for reflecting the image from the display to the combiner and allowing reflected images of the display and images from the scene to pass therethrough.

\* \* \* \* \*